(12) United States Patent
Han et al.

(10) Patent No.: US 9,244,551 B2
(45) Date of Patent: Jan. 26, 2016

(54) ADAPTIVE TOUCH SCANNING

(71) Applicant: INTEL CORPORATION, Santa Clara, CA (US)

(72) Inventors: Kyungtae Han, Hillsboro, OR (US); Dongho Hong, Portland, OR (US); Alexander Min, Portland, OR (US); Yong-Joon Park, Portland, OR (US); Mohamed A. Abdelmoneum, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 14/033,044

(22) Filed: Sep. 20, 2013

(65) Prior Publication Data

US 2015/0084872 A1    Mar. 26, 2015

(51) Int. Cl.
*G06F 3/041*    (2006.01)
*G06F 1/32*    (2006.01)

(52) U.S. Cl.
CPC .............. *G06F 3/041* (2013.01); *G06F 1/3262* (2013.01)

(58) Field of Classification Search
CPC ........ G06F 3/041; G06F 3/0418; G06F 3/044
USPC ...................... 345/173–184; 178/18.01–20.04
See application file for complete search history.

(56) References Cited

U.S. PATENT DOCUMENTS

| | | | | |
|---|---|---|---|---|
| 8,816,985 | B1 * | 8/2014 | Tate et al. ...................... | 345/173 |
| 2007/0091078 | A1 * | 4/2007 | Park et al. ...................... | 345/173 |
| 2007/0229468 | A1 * | 10/2007 | Peng et al. ..................... | 345/173 |
| 2012/0105357 | A1 * | 5/2012 | Li et al. .......................... | 345/174 |

* cited by examiner

*Primary Examiner* — Shaheda Abdin
(74) *Attorney, Agent, or Firm* — International IP Law Group, P.L.L.C.

(57) ABSTRACT

An apparatus, touch controller, and system for adaptive touch scanning is described herein. The apparatus includes logic to calculate a distance traveled between two consecutive touch samples, and logic to compare the distance traveled with a target distance to find an actual error. The apparatus also includes logic to update the scan rate based on the actual error.

17 Claims, 8 Drawing Sheets

300

800

200

300

600

ADAPTIVE TOUCH SCANNING

TECHNICAL FIELD

The present techniques relate generally to an apparatus and system for adaptive touch scanning. More specifically, the present techniques adjust a sampling frequency on the fly according to the frequency of touch events.

BACKGROUND ART

Computing devices may be equipped with touch interfaces that use sensors to enable touch data input to the computing device. Typically, a touch controller manages the touch interface by scanning the display to detect user input. In some cases, user input detected by a touch interface may be referred to as a touch event. Touch controllers have a high, fixed scan interval to guarantee good touch responsiveness. For example, the scan interval may be a fixed scan interval of once every 10 milliseconds (ms). Frequent scans of the display may cause touch event or interrupts that can prevent the computing device from entering a lower power state or a sleep state.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
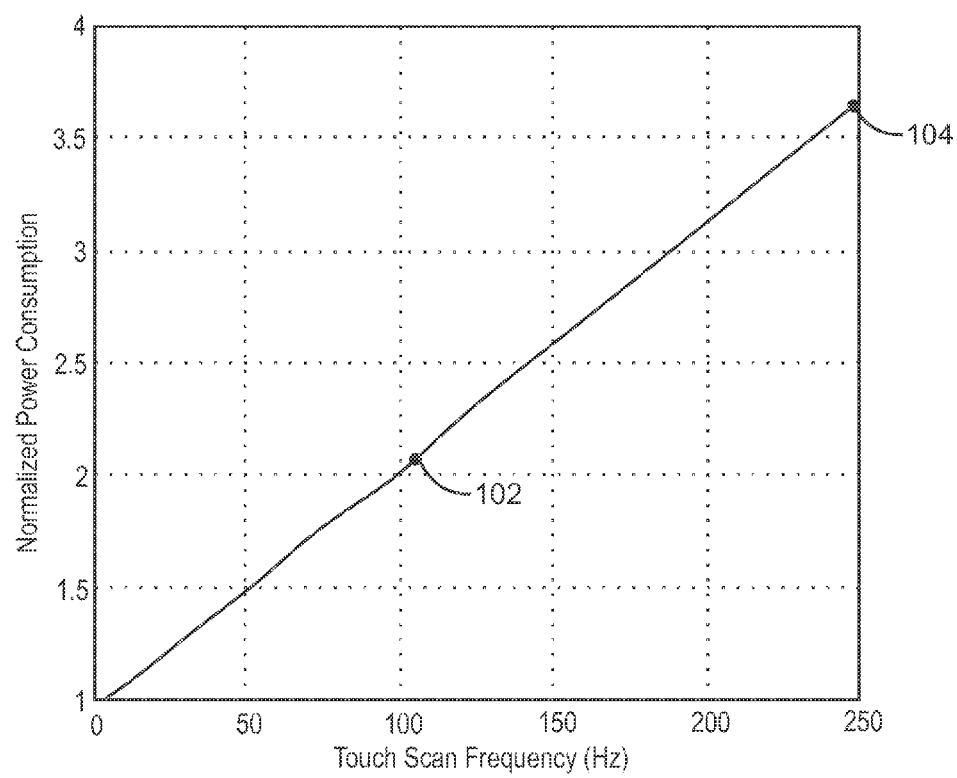
FIG. 1 is a graph illustrating normalized power consumption for different touch scan frequencies.

Computing devices such as small form-factor mobile platforms that include smart phones, tablets, ultrabooks and the like are rapidly becoming the main vehicle for computing, networking, and entertaining. These devices typically include sensors and a touch interface as a primary means to enable intuitive, prompt, and accurate user-device interactions with each device. Touch interfaces may be managed by a touch controller. The touch controller typically scans the display of the computing device at a fixed, pre-defined frequency to detect user input. User input detected by a touch interface may be referred to as a touch event, and can include the x, y coordinate of the touch on the display. While frequent scanning can result in better responsiveness, frequent scanning may also result in wasted power. The wasted power may be from the touch panel, as well as the entire platform, because each scan event or interrupt may prevent the device from entering lower-power sleep states. In some cases, a scan event is when a scan is performed by the computing device. Scan events are typically executed by the scan controller. A touch event may be user input such as a user touch to the display, that is detected during the scan event. The touch can be performed with any instrument, such as a human finger or a stylus.

Embodiments described herein enable adaptive touch scanning. In embodiments, the touch interval or sampling frequency may be adjusted on the fly so that the distance between two consecutive touches is maintained at a pre-defined target distance. In some cases, adjusting the touch interval or sampling frequency on the fly refers to adjusting the touch interval or sampling frequency as the user is interacting with the computing device or in response to the user's interaction with the computing device. As a result, both over-sampling and under-sampling in touch inputs of a computing device can be avoided, making adaptive touch scanning energy efficient while providing a high-quality, consistent touch experience. Additionally, in embodiments, a proportional-integral-derivative controller (PID) controller may track the touch input coordinates and speed.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a graph 100 illustrating normalized power consumption for different touch scan frequencies. As shown by the graph 100, power consumption increases almost linearly with touch scan frequency. A scan interval of 10 ms results in a touch scan frequency of 100 hertz (Hz) at reference number 102. Similarly, a scan interval of 4 ms results in a touch scan frequency of 250 Hz at reference number 104. When the touch scan interval is reduced from 10 ms at reference number 102 to 4 ms at reference number 104, power consumption may increase 1.8 times from 2.01 to 3.67. Accordingly, lowering scan frequency may reduce the power consumption. However, with a lower scan frequency, touch responsiveness and touch detection accuracy may be lost, which can ultimately hurt user experience.

Figure 2:
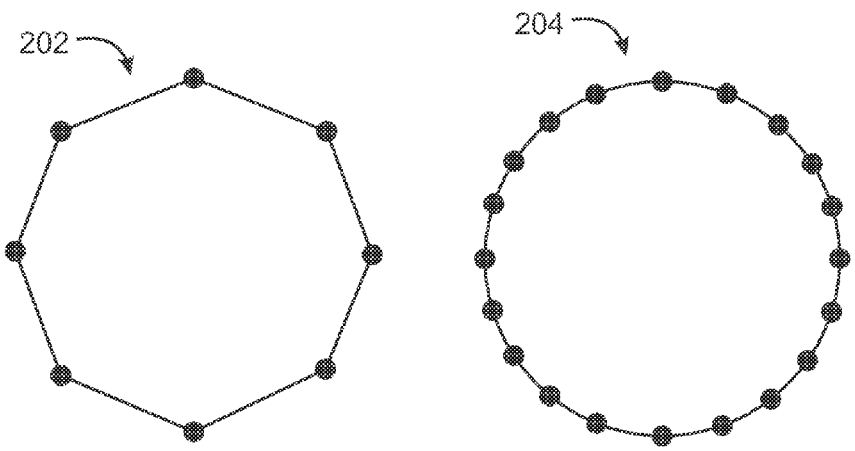
FIG. 2 is an illustration of two circles drawn with a fast touch motion at fixed scan intervals.

FIG. 2 is an illustration of two circles drawn with a fast touch motion at fixed scan intervals. Typically, touch controllers are not optimized for dynamic touch behavior of users. For example, a user may touch the display of a computing device at a slow rate while browsing a web page. When a user touches the display at a slow rate, it may be referred to as a "slow touch." The user's touch frequency may increase when the user plays a game on the computing device. A faster rate of touch on the display of the computing device may be referred to as a "fast touch."

The circle at reference number 202 was drawn using a fast touch motion and a 10 ms scan interval. The dots along the polygon at reference number 202 indicate the samples taken during the fast touch motion at a 10 ms scan interval. The circle at reference number 202 appears as a polygon rather than the circle that was drawn using a fast touch. This is a result of the user motion being too fast compared to the samples being taken at a 10 ms scan interval. The circle at reference number 204 was drawn using a fast touch motion and a 4 ms scan interval. The higher scan interval of 4 ms at reference number 204 when compared to the 10 ms scan interval at reference number 202 results in a circle, as more samples were taken. However, as discussed with respect to FIG. 1, reducing the scan interval from 10 ms to 4 ms results in an increase in power consumption.

Figure 3:
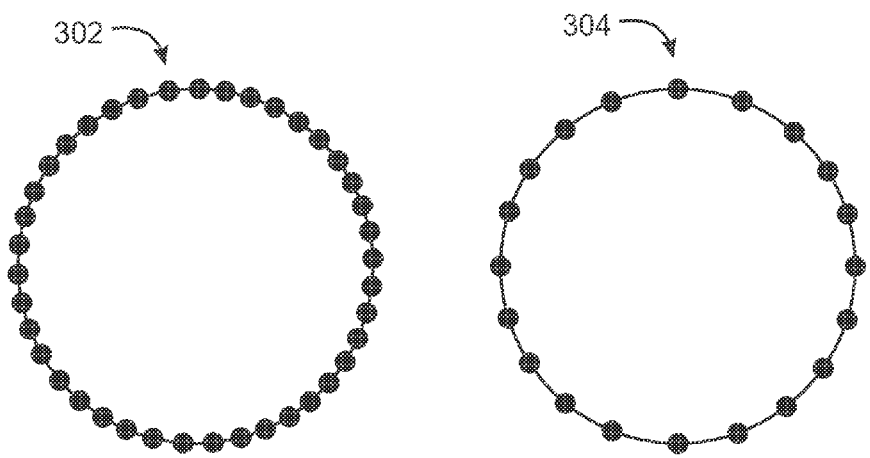
FIG. 3 is an illustration of two circles drawn with a slow touch motion at fixed scan intervals.

FIG. 3 is an illustration of two circles drawn with a slow touch motion at fixed scan intervals. The circle at reference number 302 was drawn using a slow touch motion and a 10 ms scan interval. The dots along the circle at reference number 302 indicate the samples taken during the slow touch motion at a 10 ms scan interval. The 10 ms scan interval during a slow touch motion results in over-sampling of the user touch, as indicated by the high number of dots that appear along the circle at reference number 302. Over-sampling results in a wasted power from the computing device, as the same circle could have been drawn with fewer samples. Particularly, the circle at reference number 304 was drawn using a slow touch motion and a 30 ms scan interval. The 30 ms scan interval at reference number 304 captures enough touch events during the slow touch motion, as indicated by the dots along the circle, to draw a smooth circle.

FIGS. 2 and 3 illustrate that a touch scan algorithm with fixed scan rate, such as once every 10 ms, may not be sufficient to provide best touch experience. As noted in FIG. 2, a scan interval of 10 ms during a fast touch motion is too slow to accurately capture the user motion, while a scan interval of 10 ms during a slow touch motion is too fast and results in over sampling. An intelligent touch interface control system may be used to dynamically adjust touch scan interval "on-the-fly" based on the speed of the touch motion, resulting in power savings and improved touch responsiveness.

An adaptive touch scanning algorithm may be used to minimize the number of touch sample instances, thus minimizing the touch-incurred energy consumption, while enhancing (or at least preserving) the touch quality. In some cases, touch quality refers to the responsiveness of the computing device to a user's touch input. The adaptive touch scanning algorithm lowers the touch sample rate when a user's touch motion is slow, and increases the touch sample rate when a user's touch motion increases in order to minimize touch incurred energy consumption while enhancing or maintaining the touch quality.

Figure 4:
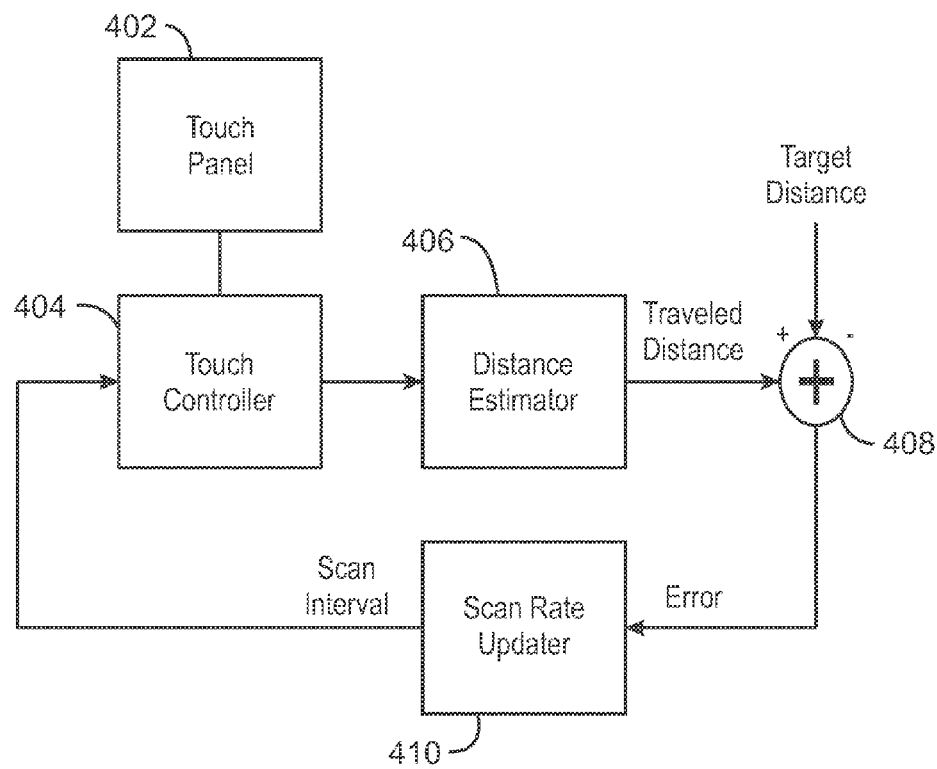
FIG. 4 is a block diagram of a dynamic touch scan rate architecture.

FIG. 4 is a block diagram of a dynamic touch scan rate architecture. A touch panel 402 is used to receive touch input from a user. In order to maintain the sampled touch distance at a desired target distance, a touch controller 404 may be implemented as a PID control mechanism that includes generic control loop feedback that can be used in the absence of knowledge of the underlying process. In embodiments, the controller 404 minimizes error by adjusting the control inputs, where the error values are calculated as the difference between a measured distance and a target distance.

A distance estimator 406 calculates the traveled distance between two consecutive touch samples. In embodiments, a pixel may be used as a unit of traveled distance. In examples, a distance estimation to minimize computation may be computed as:

$$\Delta d_i = |x_i - x_{i-1}| + |y_i - y_{i-1}| \qquad (1)$$

where, $x_i$, $y_i$ is a pixel coordinate touch that occurred at the $i^{th}$ event.

A comparator 408 calculates the actual error, where the actual error is the error between the actual traveled distance and a pre-defined target distance. In some cases, the pre-defined target distance is a distance between two consecutive touch inputs that should be maintained, regardless of the speed of the touch input or the behavior of a touch input. A scan rate updater 410 updates the touch scan rate based on the three error components with their associated weights as shown in the equation below:

$$u(t) = K_p e(t) + K_i \int_0^t e(r)\,dr + K_d \frac{d}{dt} e(t) \qquad (2)$$

Specifically, the three error components $K_p$, $K_i$, and $K_d$ are the proportional (P) gain, integral (I) gain, and derivative (D) gain terms, respectively, associated with a PID controller. These three components closely interact with each other, and update the touch scan interval while touch inputs are generated. Moreover, e represents error, and t represents time. In some cases, the PID coefficients P, I, and D, can be set as 0.1, 2000, and 0.005, respectively. However, the coefficients can be further optimized to improve the efficiency/accuracy of the touch controller.

Table 1 illustrates the PID algorithm based on Equation 2, which may be used in adaptive touch scanning as discussed above. An initial touch scan interval may be set to provide a pre-defined level of responsiveness for the first touch event.

TABLE 1

```
set constant Kp, Ki, Kd, initial_integral, initial_scan_interval,
    max_scan_interval, min_scan_interval and target_distance
while (true)
    scan_interval = initial_scan_interal
    integral = initial_integral
    previous_error = 0
    while (consecutive touch events)
        calculate Δd
        error = target_distance − Δd
        integral = integral + error x scan_interval
        derivative = (error − previous_error) / scan_interval
        scan_interval = Kp x error + Ki x integral + Kd x derivative
        if scan_interval > max_scan_interval
            scan_interval = max_scan_interval
        if scan_interval < min_scan_interval
            scan_interval = min_scan_interval
        previous_error = error
        update touch controller with scan_interval
    end while
end while
```

In the algorithm shown in Table 1, the initial scan interval is set to 10 ms. The upper bound of the touch scan interval may be limited to 35 ms in order to guarantee a minimum responsiveness and react effectively against sudden motion speed increment. Additionally, the lower bound of the touch scan interval may be limited to 4 ms due to hardware limitation of the touch sensor device.

The target distance is the desired distance to sample. The target distance should be set so that it can provide a smooth touch experience while avoiding over-sampling of the touch events. The optimal target distance also depends on the size of the touch panel as well as the resolution of the touch panel. In some examples, the target distance may be set according to a number of pixels.

Figure 5:
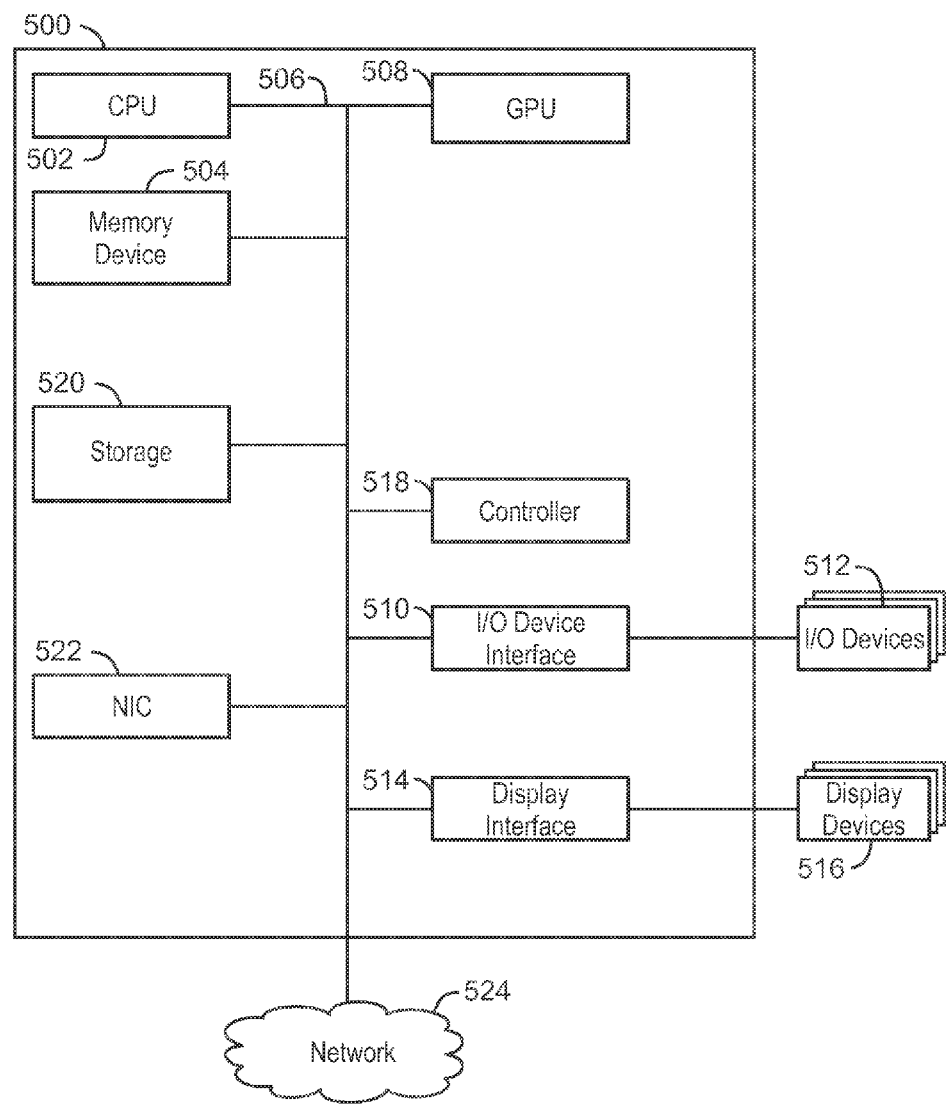
FIG. 5 is a block diagram of a computing device that may be used with adaptive touch scanning.

FIG. 5 is a block diagram of a computing device 500 that may be used with adaptive touch scanning. The computing device 500 may be, for example, a laptop computer, desktop computer, ultrabook, tablet computer, mobile device, or server, among others. The computing device 500 may include a central processing unit (CPU) 502 that is configured to execute stored instructions, as well as a memory device 504 that stores instructions that are executable by the CPU 502. The CPU may be coupled to the memory device 504 by a bus 506. Additionally, the CPU 502 can be a single core processor, a multi-core processor, a computing cluster, or any number of other configurations. Furthermore, the computing device 500 may include more than one CPU 502. The memory device 504 can include random access memory (RAM), read only memory (ROM), flash memory, or any other suitable memory systems. For example, the memory device 504 may include dynamic random access memory (DRAM).

The computing device 500 may also include a graphics processing unit (GPU) 508. As shown, the CPU 502 may be coupled through the bus 506 to the GPU 508. The GPU 508 may be configured to perform any number of graphics operations within the computing device 500. For example, the GPU 508 may be configured to render or manipulate graphics images, graphics frames, videos, or the like, to be displayed to a user of the computing device 500.

The CPU 502 may also be connected through the bus 506 to an input/output (I/O) device interface 510 configured to connect the computing device 500 to one or more I/O devices 512. The I/O devices 512 may include, for example, a keyboard and a pointing device, wherein the pointing device may include a touchpad or a touchscreen, among others. The I/O devices 512 may be built-in components of the computing device 500, or may be devices that are externally connected to the computing device 500. The CPU 502 may also be linked through the bus 506 to a display interface 514 configured to connect the computing device 500 to a display device 516. The display device 516 may include a display screen that is a built-in component of the computing device 500. The display device 516 may also include a computer monitor, television, or projector, among others, that is externally connected to the computing device 500. The computing device 100 may also include a controller 518. The controller 518 may be a touch controller implemented as a PID controller discussed above.

In embodiments, the computing device 100 includes an I/O device 512 that is a touchscreen. The touchscreen can be implemented using various types of touch sensors like resistive, capacitive, optical, or ultrasound transducers. The transducers may be printed or attached to a cover glass plate bonded to the display panel, and then connected to an application specific integrated circuit (ASIC) chip that has all the front end amplifiers, digital to analog converters, filters, current and voltage sources and IO's. The ASIC may perform signal readout, calibration and digitization of the analog signal, and then transmits it to a digital controller, such as the controller 518. The digital controller executes all the touch algorithms for extracting the touch coordinates, and executing other calibration functions, such as palm rejection, ambient light calibration and so on.

The computing device also includes a storage device 518. The storage device 518 is a physical memory such as a hard drive, an optical drive, a thumbdrive, an array of drives, or any combinations thereof. The storage device 518 may also include remote storage drives. The computing device 500 may also include a network interface controller (NIC) 520 may be configured to connect the computing device 500 through the bus 506 to a network 522. The network 522 may be a wide area network (WAN), local area network (LAN), or the Internet, among others.

The block diagram of FIG. 5 is not intended to indicate that the computing device 500 is to include all of the components shown in FIG. 5. Rather, the computing system 500 can include fewer or additional components not illustrated in FIG. 5 (e.g., sensors, power management integrated circuits, additional network interfaces, etc.). The computing device 500 may include any number of additional components not shown in FIG. 5, depending on the details of the specific implementation. Furthermore, any of the functionalities of the CPU 502 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 6:
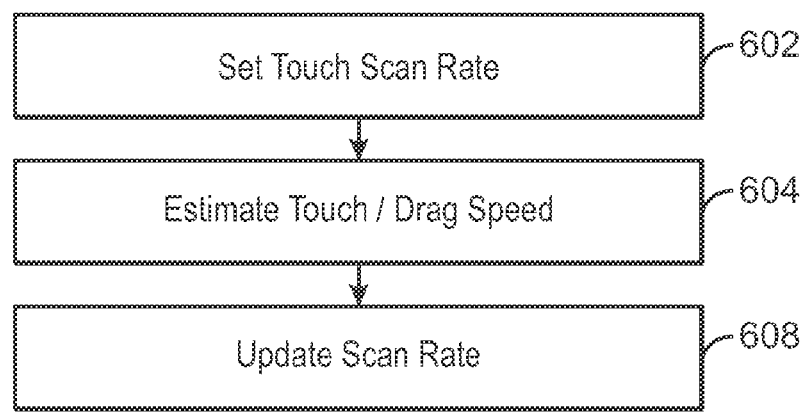
FIG. 6 is a process flow diagram for adaptive touch scanning.

FIG. 6 is a process flow diagram 600 for adaptive touch scanning. At block 602, a scan interval is set. Initially, the scan interval may be set to 10 ms for a substantially prompt response to a first touch event. For subsequent touch events, the scan interval may be calculated. At block 604, the touch speed may be estimated. A distance estimator, such as the distance estimator 406 (FIG. 4) is used to calculate the traveled distance between two consecutive touch samples. A comparator 408 (FIG. 4) may calculate the actual error. At block 608, the scan rate is updated. A scan rate updater 410 (FIG. 4) may update the touch scan rate based on the error components associated with a PID controller.

Figure 7:
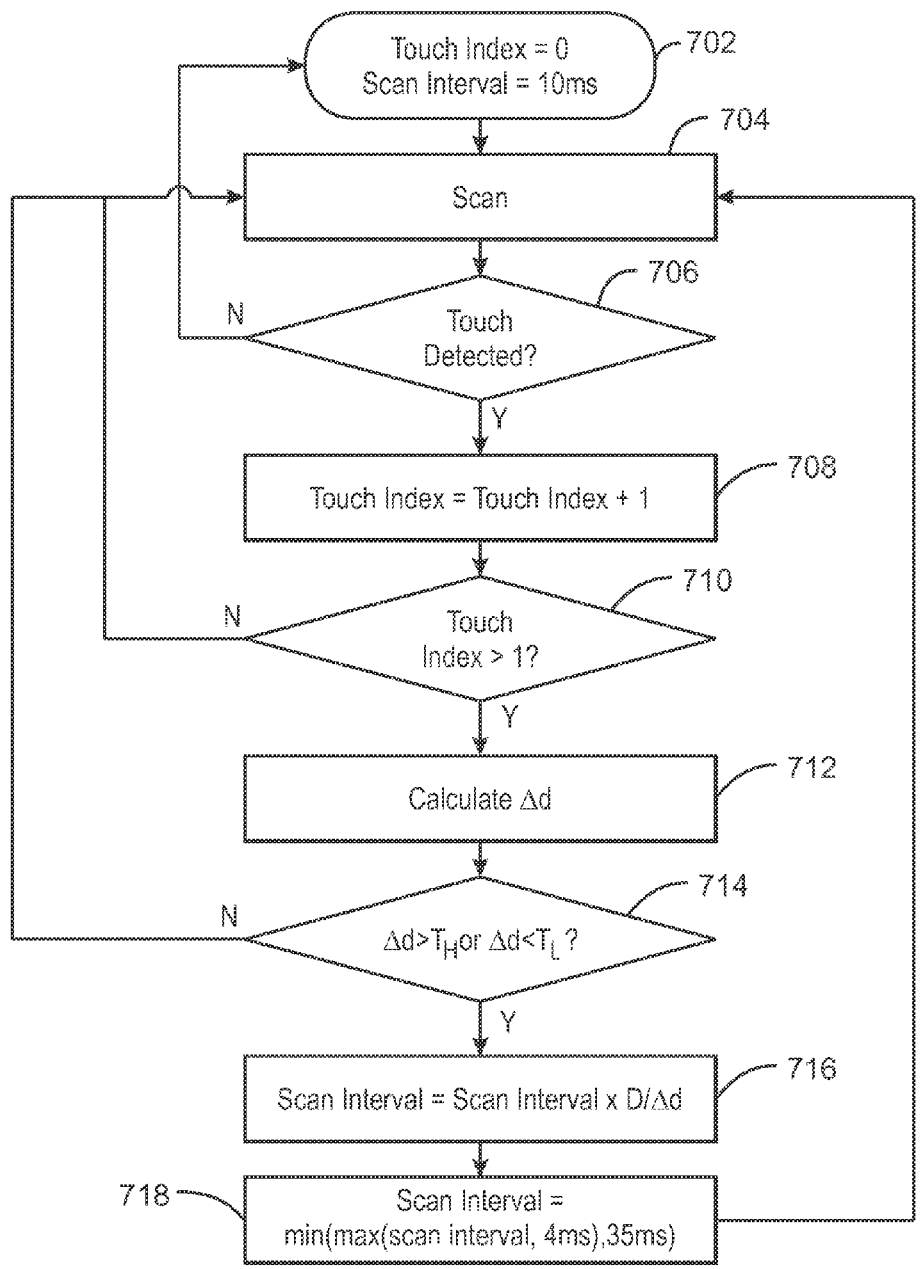
FIG. 7 is another process flow diagram for adaptive touch scanning.

FIG. 7 is another process flow diagram 700 for adaptive touch scanning. In embodiments, the distance traveled during each scan event may be monitored. The distance traveled may be maintained within a certain range by adjusting the next scan interval. Specifically, the scan interval may be increased if the traveled distance is less than a low threshold $T_L$ and the scan interval may be decreased if the traveled distance is larger than a high threshold $T_H$. At block 702, a touch index is set to 0, and the scan interval is set to 10 ms. At block 704, scanning of the touch panel occurs. At block 706, it is determined if a touch has been detected. If a touch has been detected, process flow continues to block 708. If a touch has not been detected, process flow returns to block 704 for more scanning.

At block 708, the touch index is incremented by 1. At block 710, it is determined if the touch index is greater than 1. If the touch index is not greater than 1, process flow returns to block 704. If the touch index is greater than 1, process flow continues to block 712. At block 712, the traveled distance between two consecutive touch samples is calculated. At block 714, it is determined if the traveled distance between two consecutive touch samples $\Delta d$ is less than a low threshold $T_L$ or greater than a high threshold $T_H$. If the traveled distance between two consecutive touch samples $\Delta d$ is not less than a low threshold $T_L$ or greater than a high threshold $T_H$, process flow returns to block 704. If the traveled distance between two consecutive touch samples $\Delta d$ is less than a low threshold $T_L$ or greater than a high threshold $T_H$, process flow continues to block 716.

At block 716, the scan interval is set equal to a traveling distance D divided by the traveled distance between two consecutive touch samples $\Delta d$. The traveling distance may be set equal to the high threshold minus the low threshold divided by 2:

$$D = \frac{T_H - T_L}{2}$$

where the scan interval is:

$$\text{scan interval} = \text{scan interval}\left(\frac{D}{\Delta d}\right)$$

At block 718, the scan interval is found by finding the maximum of the previously calculated scan interval and 4 ms. The selected maximum is then compared with 35 ms, and the minimum of the two values is selected. Accordingly, the scan interval may be found by:

scan interval=min(max(scan interval,4ms),35ms)

In other words, the upper bound and lower bound of the scan interval are set to 4 ms and 35 ms, respectively. A scan interval greater than 35 ms is not able to respond to sudden motion speed increment. If a scan does not detect any touches, the scan interval can be set to 10 ms.

The fixed scan rate algorithm consumes a nearly constant amount of power, regardless of the touch motion speed. This constant power consumption by the fixed scan rate algorithm is highly inefficient. In contrast, the touch power consumption of the adaptive scanning algorithm gradually decreases as the touch motion speed decreases. In some cases, the adaptive scanning algorithm reduces the power consumption by half at a very slow speed when compared to the fixed scan rate algorithm. The power overhead from switching the scan rates is negligible, and power savings from the adaptive scanning algorithm outweighs any power overhead when switching scan rates.

Figure 8:
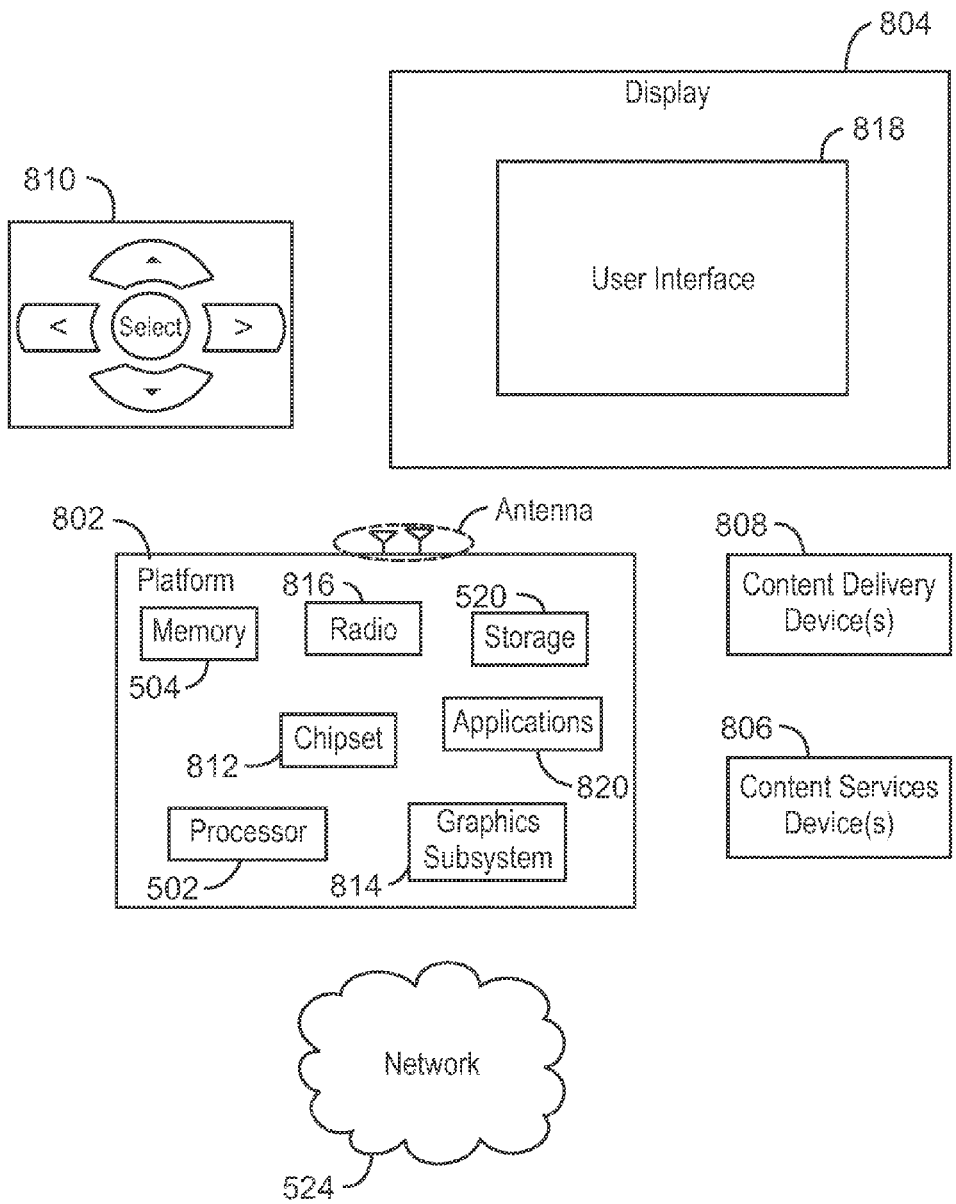
FIG. 8 is a block diagram of an exemplary system for an adaptive scanning algorithm.

FIG. 8 is a block diagram of an exemplary system 800 for an adaptive scanning algorithm. Like numbered items are as described with respect to FIG. 5. In some embodiments, the system 800 is a media system. In addition, the system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or the like.

In various embodiments, the system 800 comprises a platform 802 coupled to a display 804. The platform 802 may receive content from a content device, such as content services device(s) 806 or content delivery device(s) 808, or other similar content sources. A navigation controller 810 including one or more navigation features may be used to interact with, for example, the platform 802 and/or the display 804. Each of these components is described in more detail below.

The platform 802 may include any combination of a chipset 810, a CPU 502, a memory device 504, a storage device 520, a graphics subsystem 814, applications 820, and a radio 816. The chipset 810 may provide intercommunication among the CPU 502, the memory device 504, the storage device 520, the graphics subsystem 814, the applications 820, and the radio 814. For example, the chipset 810 may include a storage adapter (not shown) capable of providing intercommunication with the storage device 520.

The CPU 502 may be a standalone unit, or the CPU 502 may be implemented as a component of a Complex Instruction Set Computer (CISC) or Reduced Instruction Set Computer (RISC) processors, x86 instruction set compatible processors, multi-core, or any other microprocessor or central processing unit (CPU). In some embodiments, the CPU 502 is a component of dual-core processor(s), dual-core mobile processor(s), or the like.

The memory device 504 may be implemented as a volatile memory device such as, but not limited to, a Random Access Memory (RAM), Dynamic Random Access Memory (DRAM), or Static RAM (SRAM). The storage device 520 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, the storage device 520 includes technology to increase the storage performance enhanced protection for valuable digital media when multiple hard drives are included, for example.

The graphics subsystem 814 may perform processing of images such as still or video for display. An analog or digital interface may be used to communicatively couple the graphics subsystem 814 and the display 804. For example, the interface may be any of a High-Definition Multimedia Interface, DisplayPort, wireless HDMI, and/or wireless HD compliant techniques. The graphics subsystem 814 may be integrated into the CPU 502 or the chipset 810. Alternatively, the graphics subsystem 814 may be a stand-alone card communicatively coupled to the chipset 810.

The graphics and/or video processing techniques described herein may be implemented in various hardware architectures. For example, graphics and/or video functionality may be integrated within the chipset 810. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 816 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 816 may operate in accordance with one or more applicable standards in any version.

The display 804 may include any television type monitor or display. For example, the display 804 may include a computer display screen, touch screen display, video monitor, television, or the like. The display 804 may be digital and/or analog. In some embodiments, the display 804 is a holographic display. The display 804 may be used with adaptive touch scanning as described herein. Also, the display 804 may be a transparent surface that may receive a visual projection. Such projections may convey various forms of information, images, objects, or the like. For example, such projections may be a visual overlay for a mobile augmented reality (MAR) application. Under the control of one or more applications 820, the platform 802 may display a user interface 818 on the display 804.

The content services device(s) 806 may be hosted by any national, international, or independent service and, thus, may be accessible to the platform 802 via the Internet, for example. The content services device(s) 806 may be coupled to the platform 802 and/or to the display 804. The platform 802 and/or the content services device(s) 806 may be coupled to a network 530 to communicate (e.g., send and/or receive) media information to and from the network 530. The content delivery device(s) 808 also may be coupled to the platform 802 and/or to the display 804.

The content services device(s) 806 may include a cable television box, personal computer, network, telephone, or Internet-enabled device capable of delivering digital information. In addition, the content services device(s) 806 may include any other similar devices capable of unidirectionally or bidirectionally communicating content between content providers and the platform 802 or the display 804, via the network 530 or directly. It will be appreciated that the content may be communicated unidirectionally and/or bidirectionally to and from any one of the components in the system 800 and a content provider via the network 530. Examples of content may include any media information including, for example, video, music, medical and gaming information, and so forth.

The content services device(s) 806 may receive content such as cable television programming including media information, digital information, or other content. Examples of content providers may include any cable or satellite television or radio or Internet content providers, among others.

In some embodiments, the platform 802 receives control signals from the navigation controller 810, which includes one or more navigation features. The navigation features of the navigation controller 810 may be used to interact with the user interface 818, for example. The navigation controller 810 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combinations thereof. Such physical gestures can be recognized and translated into commands or instructions.

Movements of the navigation features of the navigation controller 810 may be echoed on the display 804 by movements of a pointer, cursor, focus ring, or other visual indicators displayed on the display 804. For example, under the control of the software, the navigation features located on the navigation controller 810 may be mapped to virtual navigation features displayed on the user interface 818. In some embodiments, the navigation controller 810 may not be a separate component but, rather, may be integrated into the platform 802 and/or the display 804.

The system 800 may include drivers (not shown) that include technology to enable users to instantly turn on and off the platform 802 with the touch of a button after initial boot-up, when enabled, for example. Program logic may allow the platform 802 to stream content to media adaptors or other content services device(s) 806 or content delivery device(s) 808 when the platform is turned "off." In addition, the chipset 810 may include hardware and/or software support for 5.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 800 may be integrated. For example, the platform 802 and the content services device(s) 806 may be integrated; the platform 802 and the content delivery device(s) 808 may be integrated; or the platform 802, the content services device(s) 806, and the content delivery device(s) 808 may be integrated. In some embodiments, the platform 802 and the display 804 are an integrated unit. The display 804 and the content service device(s) 806 may be integrated, or the display 804 and the content delivery device (s) 808 may be integrated, for example. In embodiments, the platform 802 may be implemented as a system on chip (SOC).

The system 800 may be implemented as a wireless system or a wired system. When implemented as a wireless system, the system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 802 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 8.

Figure 9:
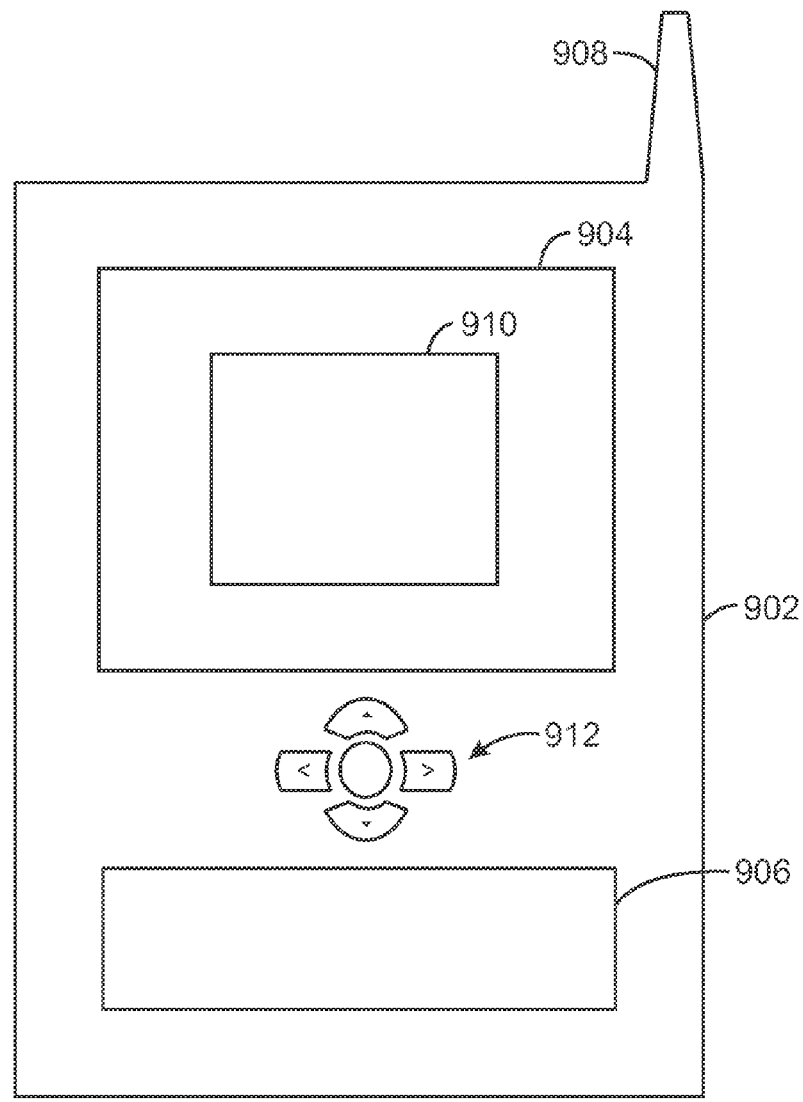
FIG. 9 is a schematic of a small form factor device in which the system of FIG. 8 may be embodied.

FIG. 9 is a schematic of a small form factor device 900 in which the system 800 of FIG. 8 may be embodied. Like numbered items are as described with respect to FIG. 9. In some embodiments, for example, the device 900 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well.

As shown in FIG. 9, the device 900 may include a housing 902, a display 904, an input/output (I/O) device 906, and an antenna 908. The device 900 may also include navigation features 910. The display 904 may include any suitable display unit for displaying information appropriate for a mobile computing device. The I/O device 906 may include any suitable I/O device for entering information into a mobile computing device. For example, the I/O device 906 may include an alphanumeric keyboard, a numeric keypad, a touch pad, input keys, buttons, switches, rocker switches, microphones, speakers, a voice recognition device and software, or the like. Information may also be entered into the device 900 by way of microphone. Such information may be digitized by a voice recognition device.

EXAMPLE 1

An apparatus for adaptive touch scanning is described herein. The apparatus includes logic to calculate a distance traveled between two consecutive touch samples and logic to compare the distance traveled with a target distance to find an actual error. The apparatus also include logic to update the scan rate based on the actual error. The actual error may be determined using proportional (P) gain, integral (I) gain, and derivative (D) gain coefficients. Additionally, the proportional (P) gain, integral (I) gain, and derivative (D) gain coefficients may be optimized with respect to a touch controller. The scan rate may be adjusted on the fly based on a speed of touch motion. Further, the predefined target distance may be a distance between two consecutive touch inputs. The scan rate may be updated while touch inputs are generated, and an initial scan rate may be 10 milliseconds.

EXAMPLE 2

A touch controller for adaptive touch scanning is described herein. The touch controller includes a distance estimator, a comparator, and a scan interval updater. The distance estimator may calculate the traveled distance between two consecutive touch samples, and the comparator may calculate an actual error. The scan interval updater may update a touch scan rate of the touch controller. The touch controller may be a proportional, integral, and derivative (PID) controller. Moreover, the PID controller may be optimized using proportional (P) gain, integral (I) gain, and derivative (D) gain coefficients. The scan interval updater may maintain a distance traveled between consecutive touch events within a certain range by adjusting a next scan interval. Additionally, the scan interval may be increased if the traveled distance is less than a low threshold, and the scan interval is decreased if the traveled distance is larger than a high threshold.

EXAMPLE 3

A system that performs adaptive touch scanning is described herein. The system includes a display, a radio, and a memory that is to store instructions and that is communicatively coupled to the display. The system also includes a processor communicatively coupled to the radio and the memory, wherein when the processor is to execute the instructions, the processor is to calculate a distance traveled between two consecutive touch samples and compare the distance traveled with a target distance to find an actual error. Additionally, when the processor is to execute the instructions, the processor is to update the scan rate based on the actual error. The actual error may be determined using proportional (P) gain, integral (I) gain, and derivative (D) gain coefficients. The proportional (P) gain, integral (I) gain, and derivative (D) gain coefficients may be optimized with respect to a touch controller. The scan rate may be adjusted on the fly based on a speed of touch motion. Additionally, the scan rate may be updated while touch inputs are generated.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for adaptive touch scanning, comprising:
   a distance estimator to calculate a distance traveled between two consecutive touch samples;
   a comparator to compare the distance traveled with a target distance to find an actual error; and
   a scan rate updater to update a scan rate based on the actual error, wherein a scan interval is increased if the distance traveled is less than a low threshold, and the scan interval is decreased if distance the traveled is larger than a high threshold.

2. The apparatus of claim 1, wherein the actual error is determined using proportional (P) gain, integral (I) gain, and derivative (D) gain coefficients.

3. The apparatus of claim 2, wherein the proportional (P) gain, integral (I) gain, and derivative (D) gain coefficients are optimized with respect to a touch controller.

4. The apparatus of claim 1, wherein the scan rate is adjusted on the fly based on a speed of touch motion.

5. The apparatus of claim 1, wherein the target distance is a predefined distance between two consecutive touch inputs.

6. The apparatus of claim 1, wherein the scan rate is updated while touch inputs are generated.

7. The apparatus of claim 1, wherein an initial scan rate is 10 milliseconds.

8. A touch controller for adaptive touch scanning, comprising:
   a distance estimator to calculate a distance estimation;
   a comparator to compare the distance estimation with a distance to be maintained between touch inputs to find an actual error; and
   a scan interval updater to update a scan rate based on the actual error, wherein a scan interval is increased if the distance estimation is less than a low threshold, and the scan interval is decreased if the distance estimation is larger than a high threshold.

9. The touch controller of claim 8, wherein the scan interval updater updates a touch scan rate of the touch controller.

10. The touch controller of claim 8, wherein the touch controller is a proportional, integral, and derivative (PID) controller.

11. The touch controller of claim 10, wherein the PID controller is optimized using proportional (P) gain, integral (I) gain, and derivative (D) gain coefficients.

12. The touch controller of claim 8, wherein the scan interval updater maintains a distance traveled between consecutive touch events within a certain range by adjusting a next scan interval.

13. A system that performs adaptive touch scanning, comprising:
   a display;
   a radio;
   a memory that is to store instructions and that is communicatively coupled to the display; and
   a processor communicatively coupled to the radio and the memory, wherein when the processor is to execute the instructions, the processor is to:
   calculate a distance traveled between two consecutive touch samples;
   compare the distance traveled with a target distance to find an actual error; and
   update the scan rate based on the actual error, wherein a scan interval is increased if the traveled distance is less than a low threshold, and the scan interval is decreased if the traveled distance is larger than a high threshold.

14. The system of claim 13, wherein the actual error is determined using proportional (P) gain, integral (I) gain, and derivative (D) gain coefficients.

15. The system of claim 14, wherein the proportional (P) gain, integral (I) gain, and derivative (D) gain coefficients are optimized with respect to a touch controller.

16. The system of claim 13, wherein the scan rate is adjusted on the fly based on a speed of touch motion.

17. The system of claim 13, wherein the scan rate is updated while touch inputs are generated.

* * * * *